Sept 10, 1957  F. W. VOGES  2,805,447
SAFETY CIRCUIT FOR MOLDING MACHINE
Filed Nov. 5, 1953  2 Sheets-Sheet 1

INVENTOR.
Fred W. Voges
BY
Kane, Dalsimer and Kane
ATTORNEYS

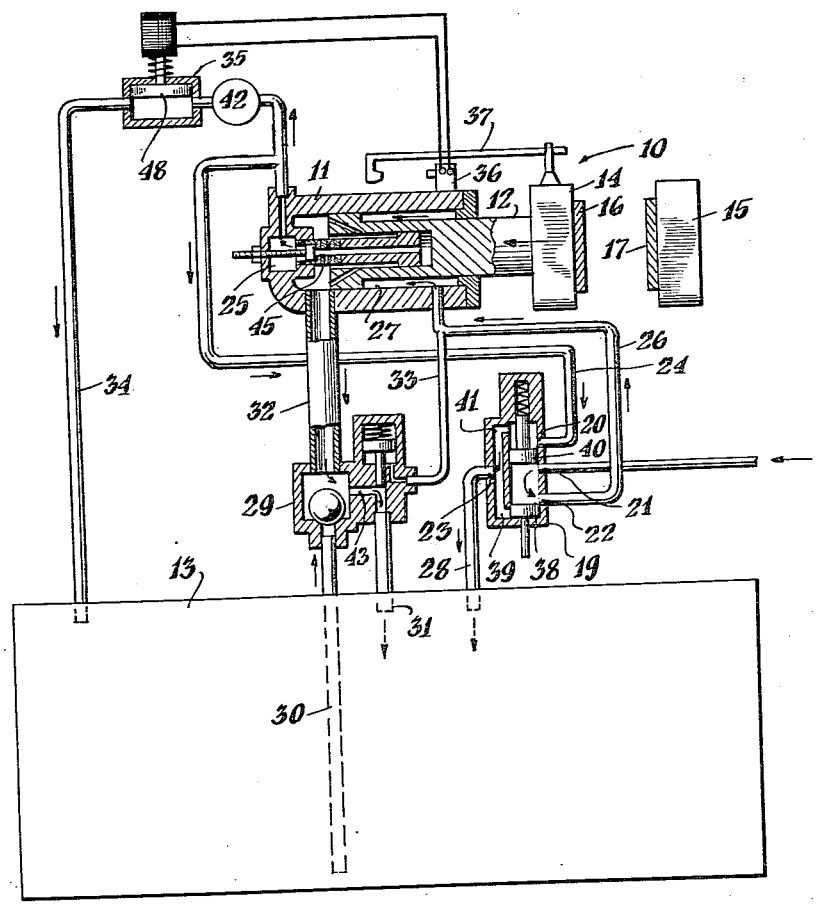

United States Patent Office 2,805,447
Patented Sept. 10, 1957

2,805,447

SAFETY CIRCUIT FOR MOLDING MACHINE

Fred William Voges, Manhasset, N. Y.

Application November 5, 1953, Serial No. 390,284

3 Claims. (Cl. 18—30)

This invention relates to molding machines and more particularly to a hydraulic molding machine and a means for prematurely interrupting the molding operation of said hydraulic molding machine.

It is an object of this invention to provide a molding machine which is operated through part of its advancing stroke by a low pressure and which is operated at the end of its advancing stroke by a high pressure and having a means for interrupting the advancing stroke before the high pressure is applied.

It is another object of this invention to provide a hydraulic molding machine which has an advancing stroke in its cycle of operation in which a low pressure moves the mold parts through the major portion of the stroke and a high pressure moves the piston through a short portion of the stroke and the high pressure is applied only if a positive means is operated at the end of the stroke.

It is a further object of this invention to provide a hydraulic molding machine having a switch and valve means for completing the closure of the mold.

A still further object of this invention is the provision of a hydraulic molding machine which is operated through the major portion of the advancing stroke by a low pressure and which has a solenoid valve operable at about the end of the advancing stroke to apply a high pressure to the closure of the mold.

These and other objects of this invention will become more apparent upon consideration of the following description taken together with the accompanying drawings in which:

Fig. 3 is a diagrammatic view of the hydraulic mold of Fig. 1 showing the operating circuit in the release stroke in its cycle of operation.

In general, this invention provides a mold which is normally closed by two successive pressures, one of which is low and the other relatively higher in pounds per square inch. The second pressure in the device of this invention is not applied until the mold device has closed to the point where the molding operation is to take place so that an interruption of the closing of the mold before it has reached the position at which the high pressure is applied will prevent the mold from being closed to the point where the high pressure is applied.

Structural arrangement

Figure 1:
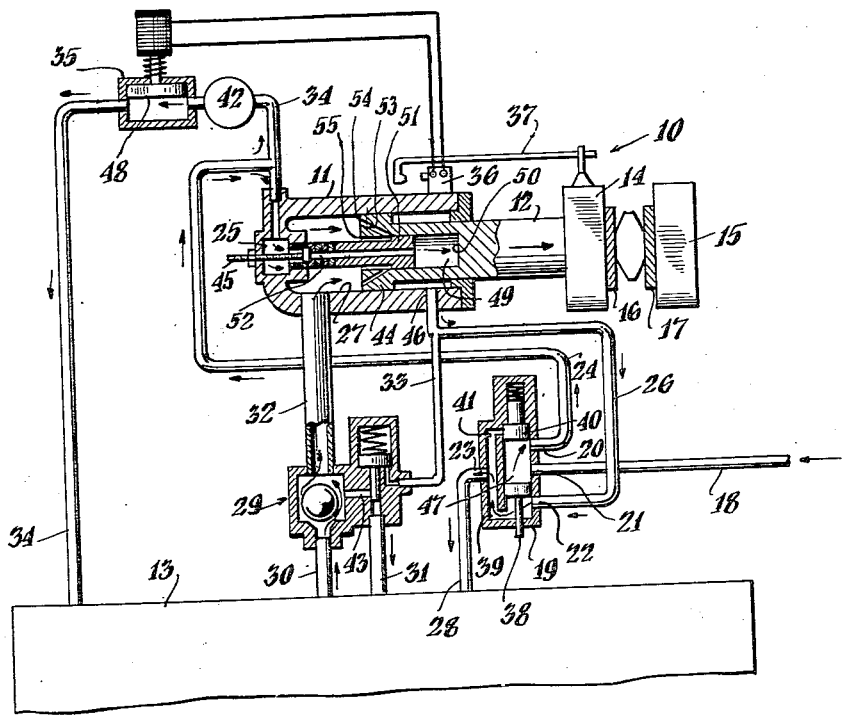
Fig. 1 is a diagrammatic view of a hydraulic mold according to this invention showing its operating circuit in the first and major portion of the advancing stroke in its cycle of operation.

Referring specifically to the figures, Fig. 1 shows a hydraulic mold 10 according to this invention in a diagrammatic view. The hydraulic mold 10 is made up principally of a hydraulic cylinder 11 in which a hydraulic ram 12 slides. The mold 10 has a reservoir 13 to which the hydraulic cylinder 11 is connected by pipe lines and valves for moving a hydraulic fluid to operate the ram 12 in the cylinder 11. A movable platen 14 is mounted on the end of the hydraulic ram 12. A stationary platen 15 is positioned adjacent to the ram 12 so that the movable platen 14 is moved into contact with the stationary platen 15. The movable platen 14 carries a mold 16 while the stationary platen 15 carries a mold 17. The molds 16 and 17 are provided with molding cavities for receiving the injected material when they are in abutting relationship. The valves and pipe lines of the hydraulic mold apparatus 10 carry the hydraulic fluid for the operation of the molding apparatus 10 and for reciprocating the ram 12 in the hydraulic cylinder 11. The pressure on the hydraulic fluid is supplied to the mold apparatus 10 through a pump line 18. The pump line 18 feeds into a four-way valve 19. The four-way valve is provided with four ports, 20, 21, 22 and 23. The pump line 18 feeds into valve 19 through inlet port 21. A pipe line 24 connects with the port 20. The pipe line 24 extends to and leads into a reservoir chamber 25 at the rear and left side of the hydraulic cylinder 11. A pipe line 26 extends from the right or advanced end of a cavity 27 in the hydraulic cylinder to the port 22 of the valve 19. A discharge pipe 28 leads from the port 23 of the valve 19 to the tank reservoir 13. A check and relief valve 29 has two discharge outlets, 30 and 31, extending downwardly into the tank 13. A pipe 32 extends upward from the side of the valve 29 opposite the tank 13 and into the cylinder 11. A smaller pipe line 33 feeds off from the pipe 26 into the relief valve portion of the check and relief valve 29.

A pipe line 34 branches off from the pipe line 24 adjacent the rear end of the cylinder 11 and feeds into the reservoir tank 13. A solenoid valve 35 is provided in the pipe line 34. The pipe 34 joins with the pipe 24. Between the juncture of the pipes 34 and 24 and the solenoid valve 35 there is positioned a pressure relief valve 42 which restricts the flow of fluid through the pipe 34. The relief valve 42 is of suitable construction and is adjustable to vary the pressure passing through it over a range of from 50–500 pounds per square inch. The adjustment of the relief valve 42 thus controls the pressure of fluid in the pipes 34 and 24 and the pressure applied in the chamber 25. The ram 12 slides in the cavity 27 in the cylinder 11. The ram 12 is provided with a piston ring 44 which abuts and slides on the inner wall of the cavity 27. The cavity 27 is thus divided into a left cavity and a right cavity by the sliding piston ring 44. These right and left cavities vary in volume with the movement of the piston ring. The ram 12 is provided with an internal bore 49 having an end wall 50. The internal bore 49 receives a piston 51 which is mounted on a piston rod 45 and is reciprocal within the bore 49. The rod 45 extends to the left and through the wall of cylinder 11. The piston 51 is provided with a central passage 52 which extends through the piston 51 from the chamber 25 to the internal bore 49. The internal bore 49 is also provided with ports 53 which connect the internal bore 49 with passages 54 which extend through the ram 12 and open into the cavity 27. A main ram area 55 is provided on the end of the ram 12 facing the cavity 27. The hydraulic fluid for moving the ram 12 that feeds through the pipe 24 in the chamber 25 passes through the central passage 52 into the internal bore 49. This fluid under pressure of the pump line 18 causes the ram 12 to move with relation to the piston 51. With the movement of the piston 12 in the cavity 27 hydraulic fluid is sucked up from the reservoir tank 13 through the pipe 30, the check valve 29 and the pipe 32 which opens into the cavity 27.

Figure 2:
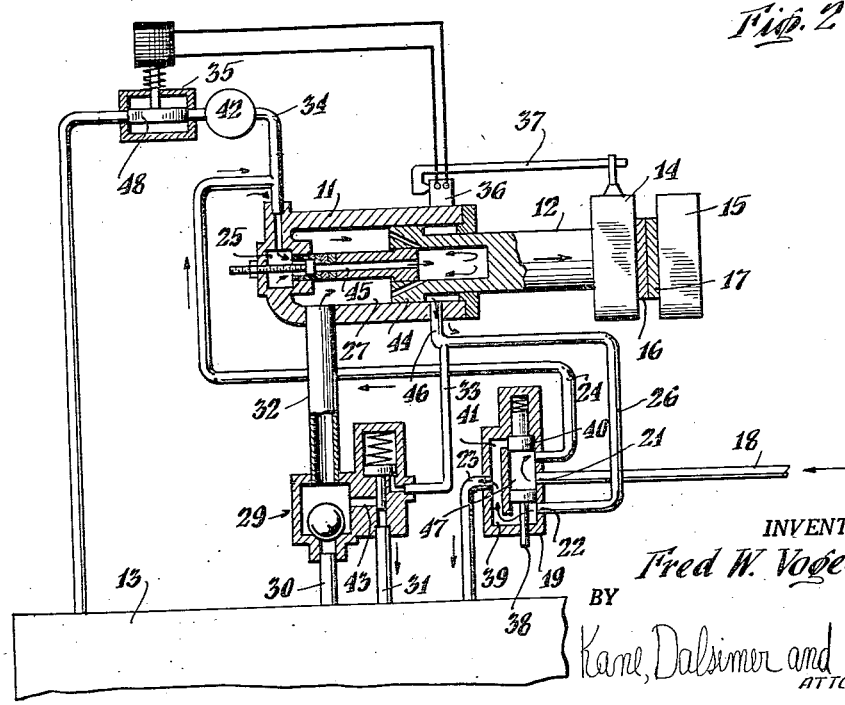
Fig. 2 is a diagrammatic view of the hydraulic mold of Fig. 1 showing the operating circuit in the shorter and final portion of the advancing stroke in its cycle of operation.

The right side of the cylinder 11, as seen in the figures, has a port 46 which connects the right cavity of the cavity 27 with the pipe 26. Dormant hydraulic fluid in front of piston ring 44 is returned to the reservoir tank 13 through the pipe line 26 and the four-way valve 19. The four-way valve 19 is provided with a passage 39 which connects with the port 22 through a central valve chamber 47, as seen in Figs. 1 and 2. A gate 38 of the valve 19 is adjustable to connect the pipe 26 and the port 22 either with the passage 39 or the pump line 18.

The solenoid valve 35, when it is closed, blocks the by-pass pipe 34, forcing all of the fluid in the line 24 into the chamber 25 to urge the ram 12 into mold closing position. A switch 36 is mounted near the movable ram 12 and connected to the solenoid valve 35. A tripper rod means 37 is mounted on the moving ram 12 to operate the switch 36 and to close the solenoid valve 35.

In Fig. 2 the hydraulic molding machine is shown in the final stages of the advancing stroke. In this phase of the advancing stroke in the cycle of operation, the ram 12 is subjected to a much higher pressure than the original piston advancing pressure. The ram 12 in the advancing stroke has traversed to the point where the switch 36 is closed by the tripper rod 37. This operates the solenoid valve 35 blocking by-pass pipe 34 with a gate 48 and forcing the hydraulic fluid from the pipe line 24 wholly into the chamber 25. The fluid in the chamber 25 passes through the central passage 52 and abuts against the end wall 50. When the ram 12 is advanced to the point of applying the high pressure, the ports 53 are moved over the piston 51 to the point where the hydraulic fluid of the internal bore 49 can flow through the passages 54 into the cavity 27. The hydraulic fluid pressure in the cavity 27 is thus applied to the main ram area 55. The full pressure from the hydraulic pump is applied to the ram 12. In this stage of the advancing stroke, the volume of hydraulic fluid that is drawn out of the tank 13 through the check valve 29 is very small as the further travel of the piston 12 is minor.

In Fig. 3 the hydraulic mold machine 10 is shown in the retraction stroke of the cycle of operation. The piston is shifted to the left, as seen in the figure. The four-way valve 19 is adjusted to bring about a reversal of the flow of the hydraulic fluid through the valve 19. The gate 38 in the central valve chamber is moved downward to clear the port 22 and connect the port 22 and the pipe 26 with the pump line 18. The hydraulic fluid pumped into the valve 19 under pressure from the pump thus flows through the central chamber 47 into the pipe 26. A gate 40 in the upper part of the four-way valve 19 is moved downward across the port 20 to cut the port 20 off from the port 21 and to connect the port 20 and the pipe 24 with a passage 41 in the valve 19. The passage 41 leads to the port 23 and the discharge pipe 28. In the retraction stroke the check means in the check and relief valve 29 is closed and the hydraulic fluid from the left cavity of the cavity 27 flows through relief passage 43 into the reservoir 13.

As the ram 12 is moved to the left the fluid in the internal bore 49 is forced through the central passage 52 in a reverse direction from the flow during the advancing stroke. The fluid flows through the pipe 24 to the port 20 and thus through the four-way valve to the discharge pipe 29. The solenoid valve 35 is in open position after release of the solenoid closing switch 36 at the beginning of the retraction stroke.

*Operation*

In operation, an advancing stroke of the ram 12 is initiated by setting the four-way valve 19 as shown in Figs. 1 and 2 with the gates 38 and 40 arranged to direct the flow of fluid from the pump through pipe 18 and the central valve chamber 47 to the pipe 24. The hydraulic fluid of the pipe 24 passes both to the pipe 34 and to the chamber 25. The hydraulic fluid in the chamber 25 flows through the central passage 52 into the internal bore 49 and pressing against the end wall 50 causes the ram 12 to move under a low initial advancing pressure. This low initial advancing pressure is determined by the adjustment of the adjustable pressure relief valve 42 in the pipe 34. The hydraulic fluid, which is by-passed through the pipe 34, flows into the reservoir tank 13. The advancing movement of the ram 12 in the cavity 27 causes hydraulic fluid to be sucked up from the reservoir tank 13 through the pipe 30, the check valve 29 and the pipe 32 into the cavity 27. The piston is thus advanced, carrying with it the movable platen and the mold piece 16 mounted thereon. Dormant hydraulic fluid to the right of the piston ring 44 of the cavity 27 passes through the port 46 to the pipe 26 and is conducted to the reservoir 13 as described above.

The low pressure fluid moves the ram 12 to the high pressure position. At the high pressure position the ram 12 is advanced to the point where the ports 53 opening on the internal bore 49 provide an application of the fluid pressure to the main ram area 55. In the high pressure position the mold pieces 16 and 17 are very nearly contiguous. At this point in the advancing stroke the tripper rod 37 contacts and actuates the solenoid switch 36 to close the solenoid valve. A gate 48 in the solenoid valve 35 blocks the by-pass pipe 34 and applies the full pressure from the pump line in the pipe line 24 to the ram 12. This pressure may be of the order of 1700 pounds, for example, as compared with a pressure of 300 pounds per square inch for advancing the piston to the high pressure position. The article to be molded is formed in cavities in the mold pieces 16 and 17 and the high pressure is maintained on the ram 12 of the mold pieces 16 and 17 during the molding operation. After the molding phase of the cycle of operation has been completed, ram 12 is withdrawn into cylinder 11 by the retraction stroke in the cycle of operation. The piston moves to the left, as seen in the figures, during the retraction stroke.

The low pressure of 300 pounds per square inch is applied to the ram and to the mold pieces through substantially the entire closing stroke. If, during this closing stroke a hard, foreign object should become positioned between the approach mold pieces 16 and 17, the closing operation is completely interrupted by a cessation of the advancing stroke, provided the article is sufficiently strong to resist the low pressure, for example, 300 pounds per square inch. The switch 36 cannot be operated and the mold pieces are held apart by the inserted foreign matter, preventing further travel of the ram 12 and the actuation of switch 36 to bring about the application of the higher pressure. When the molding operation is discontinued, the pressure remains constant at the low pressure but does increase or build up. The adjustable relief valve 42 can be adjusted to provide a range of pressures to the fluid in pipe 24. Thus the pressure for advancing the ram can be adjusted to set low. Accordingly, the hydraulic molding apparatus 10 can be adapted so that the mold pieces 16 and 17 may be held apart by relatively soft or even soft objects.

Among the advantages of this invention is the protection provided to the abutting surfaces of the mold pieces by this automatic checking device. If an object becomes positioned between the mold pieces 16 and 17, the mold pieces will not be subjected to the very high pressure of 1700 pounds per square inch. As the mold pieces are subjected to a pressure of only 300 pounds per square inch, they will be held apart and the high pressure will not be applied to the ram 12. This protects the mold pieces from squeezing between them a hard object which would mar or destroy the surface of the molds.

Another advantage of this invention is that it can be adjusted to interrupt if a hand or arm is accidentally placed between the mold pieces 16 and 17. It is thus seen that this device can be used to avoid injury to molding operators.

The device of this invention has been described above in connection with the embodiment shown in the drawings. It will be understood that this invention is not limited to the illustrated structure nor to hydraulic molding alone. The spirit of this invention is equally applicable to either hydraulic, mechanical or electronic applications in which a movement of substantial distance requiring only low pressure precedes a movement of slight distance at high pressure. In the above described embodiment the means for discontinuing the advancing stroke has been shown in the form of a switch and a solenoid valve which blocks a by-passing of fluid. In other applications this means of bringing into operation a higher pressure may be controlled by means of circuit breakers in an electronic circuit or slip clutches in a mechanical movement. In any case, the higher pressure is not applied until the piston has advanced to the point where the circuit breaker or slip clutch is operated to apply the higher pressure. Consequently, in each application the advancing pieces may be held apart by a lesser pressure than the final working pressure of the device. Various modifications of the spirit of this invention will be apparent to those skilled in the art. It is, therefore, intended that this invention be limited only by the scope of the appended claims.

I claim:

1. In a hydraulic molding apparatus of the type having a pair of mold pieces, fluid pressure responsive means supporting one of said mold pieces and means for applying fluid under pressure to said fluid pressure responsive means, a safety device comprising by-pass means limiting the pressure fluid applied to said fluid pressure means, valve means in said by-pass means to increase said fluid pressure and means actuating said valve means, so constructed and arranged that said means actuating said valve means is operable solely when said pieces are generally contiguous.

2. In a hydraulic molding apparatus of the type having a cylinder, a piston hydraulically operated in said cylinder and fluid pressure means for applying pressure to fluid on said piston, a safety device comprising by-pass means in said fluid pressure means for limiting the fluid pressure applied to said piston, valve means for closing said by-pass means to increase the fluid pressure on said piston and means for actuating said valve closing means mounted on said piston and operated by movement of said piston, so constructed and arranged that said valve closing means is actuated solely when said piston has completed almost one-half of its cycle.

3. A safety device as set forth in claim 2, said valve closing means consisting of a mechanical arm and said device including a valve actuating circuit and a circuit closing switch, said switch being actuated to close said circuit upon contact of said switch by said mechanical arm.

References Cited in the file of this patent
UNITED STATES PATENTS

| | | |
|---|---|---|
| 2,103,984 | Indge | Dec. 28, 1937 |
| 2,410,909 | Tucker | Nov. 12, 1946 |
| 2,437,077 | Cole | Mar. 2, 1948 |
| 2,476,272 | Bauman | July 19, 1949 |
| 2,481,991 | Ernst | Sept. 13, 1949 |